(12) United States Patent
Teuscher

(10) Patent No.: US 9,977,433 B1
(45) Date of Patent: May 22, 2018

(54) AUTOMATIC POOL CLEANER TRACTION CORRECTION

(71) Applicant: Hayward Industries, Inc., Elizabeth, NJ (US)

(72) Inventor: Scott Teuscher, Advance, NC (US)

(73) Assignee: Hayward Industries, Inc., Elizabeth, NJ (US)

( * ) Notice: Subject to any disclaimer, the term of this patent is extended or adjusted under 35 U.S.C. 154(b) by 0 days. days.

(21) Appl. No.: 15/587,672

(22) Filed: May 5, 2017

(51) Int. Cl.
  *E04H 4/16* (2006.01)
  *G05D 1/08* (2006.01)
  *B25J 5/00* (2006.01)

(52) U.S. Cl.
  CPC ............ *G05D 1/0875* (2013.01); *B25J 5/007* (2013.01); *E04H 4/1654* (2013.01); *G05D 2201/0203* (2013.01); *Y10S 901/01* (2013.01)

(58) Field of Classification Search
  CPC ........... G05D 1/0875; G05D 2201/0203; B25J 5/007; E04H 4/1654; E04H 4/16; Y10S 901/01
  See application file for complete search history.

(56) References Cited

U.S. PATENT DOCUMENTS

| | | |
|---|---|---|
| 2,810,350 A | 10/1957 | MacWilliams |
| 3,841,793 A | 10/1974 | MacManus |
| 3,953,152 A | 4/1976 | Sipin |
| 3,953,777 A | 4/1976 | McKee |
| 4,237,451 A | 12/1980 | Hollenbeck |
| 4,421,643 A | 12/1983 | Frederick |
| 4,505,643 A | 3/1985 | Millis et al. |
| 4,545,906 A | 10/1985 | Frederick |
| 4,715,786 A | 12/1987 | Wolff et al. |
| 4,797,666 A | 1/1989 | Baxter et al. |
| 5,083,905 A | 1/1992 | Mohn |
| 5,222,867 A | 6/1993 | Walker, Sr. et al. |
| 5,342,527 A | 8/1994 | Chevallet et al. |
| 5,464,327 A | 11/1995 | Horwitz |
| 5,540,555 A | 7/1996 | Corso et al. |

(Continued)

FOREIGN PATENT DOCUMENTS

| | | |
|---|---|---|
| CN | 1645063 A | 7/2005 |
| DE | 33 08 862 A1 | 9/1984 |

(Continued)

OTHER PUBLICATIONS

"Cover-less" Instruction Manual for the Danfoss VLT® 8000 AQUA that is coded "MG.80.A2.02" in the footer (181 pages).

(Continued)

*Primary Examiner* — Shay Karls
(74) *Attorney, Agent, or Firm* — McCarter & English, LLP

(57) ABSTRACT

A pool cleaner is provided including a top housing, a chassis and a computing system. The computing system can include a PID control module for maintaining a process variable at a setpoint value. The PID control module can receive the setpoint value for the process variable and can monitor the process variable to calculate the phase difference between the setpoint value of the process variable and the present state of the process variable. The PID control module can automatically tune the PID control module to account for the pool surface the pool cleaner is cleaning by using the phase difference previously calculated.

20 Claims, 9 Drawing Sheets

(56) References Cited

U.S. PATENT DOCUMENTS

| | | | |
|---|---|---|---|
| 5,580,221 | A | 12/1996 | Triezenberg |
| 5,631,845 | A | 5/1997 | Filev et al. |
| 5,720,068 | A | 2/1998 | Clark et al. |
| 5,730,861 | A | 3/1998 | Sterghos et al. |
| 5,775,304 | A | 7/1998 | Kono et al. |
| 5,818,714 | A | 10/1998 | Zou et al. |
| 5,819,848 | A | 10/1998 | Rasmuson et al. |
| 6,045,331 | A | 4/2000 | Gehm et al. |
| 6,056,008 | A | 5/2000 | Adams et al. |
| 6,092,618 | A | 7/2000 | Collier-Hallman |
| 6,227,806 | B1 | 5/2001 | Libfeld |
| 6,328,881 | B1 | 12/2001 | Larkner et al. |
| 6,350,105 | B1 | 2/2002 | Kobayashi et al. |
| 6,354,805 | B1 | 3/2002 | Moller |
| 6,414,455 | B1 | 7/2002 | Watson |
| 6,435,637 | B1 | 8/2002 | Lyman |
| 6,444,129 | B1 | 9/2002 | Collins |
| 6,464,464 | B2 | 10/2002 | Sabini et al. |
| 6,481,973 | B1 | 11/2002 | Struthers |
| 6,588,632 | B1 | 7/2003 | Nicol |
| 6,589,030 | B2 | 7/2003 | Ozaki |
| 6,625,824 | B1 | 9/2003 | Lutz et al. |
| 6,741,056 | B1 | 5/2004 | Hall |
| 6,776,584 | B2 | 8/2004 | Sabini et al. |
| 6,842,117 | B2 | 1/2005 | Keown |
| 6,998,807 | B2 | 2/2006 | Phillips et al. |
| 7,080,508 | B2 | 7/2006 | Stavale et al. |
| 7,117,120 | B2 | 10/2006 | Beck et al. |
| 7,170,262 | B2 | 1/2007 | Pettigrew |
| 7,244,106 | B2 | 7/2007 | Kallman et al. |
| RE40,310 | E | 5/2008 | Larkner et al. |
| 7,435,059 | B2 | 10/2008 | Smith et al. |
| 7,484,938 | B2 | 2/2009 | Allen |
| 7,704,051 | B2 | 4/2010 | Koehl |
| 7,797,062 | B2 | 9/2010 | Discenzo et al. |
| 7,815,420 | B2 | 10/2010 | Keoehl |
| 8,019,479 | B2 | 9/2011 | Stiles et al. |
| 8,869,337 | B2 * | 10/2014 | Sumonthee ........... E04H 4/1654 15/1.7 |
| 2001/0050248 | A1 | 12/2001 | Larkner et al. |
| 2003/0061004 | A1 | 3/2003 | Discenzo |
| 2004/0062658 | A1 | 4/2004 | Beck et al. |
| 2005/0058548 | A1 | 3/2005 | Thomas et al. |
| 2005/0084384 | A1 | 4/2005 | Delano et al. |
| 2005/0123408 | A1 | 6/2005 | Koehl |
| 2005/0158176 | A1 | 7/2005 | Yiu et al. |
| 2009/0290989 | A1 | 11/2009 | Mehlhorn et al. |
| 2009/0290991 | A1 | 11/2009 | Mehlhorn et al. |
| 2011/0004339 | A1 * | 1/2011 | Ozick ...................... A47L 5/30 700/245 |
| 2016/0215516 | A1 * | 7/2016 | Hayes ................... E04H 4/1654 |
| 2016/0244988 | A1 * | 8/2016 | Barcelos ............... E04H 4/1654 |

FOREIGN PATENT DOCUMENTS

| | | |
|---|---|---|
| FR | 2 832 504 A1 | 5/2003 |
| GB | 2 223 331 B | 7/1992 |
| JP | 01016993 A | 1/1989 |
| JP | 01016994 A | 1/1989 |

OTHER PUBLICATIONS

Danfoss VLT® 6000 Series Adjustable Frequency Drive Installation, Operation, and Maintenance Manual (Mar. 2000) (118 pages).
Declaration of Ali Emadi, Ph. D, U.S. Pat. No. 7,704,051, Before the Patent Trial And Appeal Board (110 pages).
Texas Instruments, Digital Signal Processing Solution for AC Induction Motor, Application Note, BPRA043 (1996) (27 pages).
Danfoss Drives A/S, Towards Autonomous Control of HVAC Systems (1999) (212 pages).
"Declaration of Prior Invention to Overcome Cited Patent (37 C.F.R. § 1.131)," including the evidence attached thereto and made a part thereof, and which was filed in the '747 Application on Mar. 14, 2006 (34 pages).
"Adaptive Control, Second Edition," Karl John Åström and Björn, Wittenmark, Lund Institute of Technology, Addison-Wesley Publishing Company, Inc., Copyright 1995 (589 pages).
"Modern Power Electronics and AC Drives," Bimal K. Bose, Prentice Hall PTR (Marked Copyright 2002; Published Oct. 2001) (728 pages).
Danfoss, VLT® AQUA Drive, "The ultimate solution for Water, Wastewater, & Irrigation" (May 2007) (16 pages).
Texas Instruments, Zhenyu Yu and David Figoli, DSP Digital Control System Applications—AC Induction Motor Control Using Constant V/Hz Principle and Space Vector PWM Technique with TMS320C240, Applicaiton Report No. SPRA284A (Apr. 1998) (131 pages).
"Gain-scheduling control of the Switched Reluctance Motor," W.K. Ho, S.K. Panda, K.W. Lim, F.S. Huang, Department of Electrical Engineering, national University of Singapore, Control Engineering Practice 6 (1998), pp. 181-189, received May 1997 and in revised from Oct. 1997 (9 pages).
Danfoss, Dynamic simulations of DH House Stations Technical Paper by Jan Eric Thorsen (published at least as early as Sep. 2002) (10 pages).
From co-pending litigation of *Pentair Water Pool and Spa, Inc. et al. v. Hayward Industries Inc. et al.*, Civil Action Case No. 5:11-cv-00459, the Transcript of Jul. 16, 2013 Deposition of E. Randolph Collins, Jr., Ph.D., P.E. (68 pages).
From Co-Pending Reexamination No. 95/002,007 for U.S. Pat. No. 7,815,420, the Feb. 13, 2013 "Declaration Under 37 C.F.R. § 1.132 of E. Randolph Collins, Jr., Ph.D., P.E." (32 pages).
Transcript of the Deposition of E. Randolph Collins Taken in the Present IPR2013-00287 on May 22, 2014 (236 pages).
*Hayward Industries, Inc. v. Pentair Water Pool and Spa, Inc.*, Case IPR2013-00287, U.S. Pat. No. 7,704,051, Petitioner's Demonstrative Exhibit 1063, Oral Hearing, Aug. 15, 2014 (24 pages).
Deposition Transcript of *Ali Emadi, Hayward Industries, Inc. v. Pentair Water Pool and Spa, Inc.*, Case IPR2013-00287, U.S. Pat. No. 7,704,051 (49 pages).
Declaration of *Randolph E. Collins, Hayward Industries, Inc. v. Pentair Water Pool and Spa, Inc.*, Case IPR2013-00287, U.S. Pat. No. 7,704,051 (18 pages).
Examiner's Answer, U.S. Appl. No. 10/730,747, dated Sep. 18, 2009 (9 pages).
Appeal Brief, U.S. Appl. No. 10/730,747, dated Jul. 20, 2009 (20 pages).
Patent Owner's Presentation, *Hayward Industries, Inc. v. Pentair Water Pool and Spa, Inc.*, Case IPR2013-00287, U.S. Pat. No. 7,704,051, Aug. 15, 2014 (13 pages).
Preliminary Response to Petition Under 37 C.F.R. § 42.107, *Hayward Industries, Inc. v. Pentair Water Pool and Spa, Inc.*, Case IPR2013-00287, U.S. Pat. No. 7,704,051 (56 pages).
Decision, Institution of Inter Partes Review, 37 C.F.R. § 42.108, *Hayward Industries, Inc. v. Pentair Water Pool and Spa, Inc.*, Case IPR2013-00287, U.S. Pat. No. 7,704,051 (31 pages).
Patent Owner Response Under 37 C.F.R. § 42.120, *Hayward Industries, Inc. v. Pentair Water Pool and Spa, Inc.*, Case IPR2013-00287, U.S. Pat. No. 7,704,051 (45 pages).
Final Written Decision, *Hayward industries, Inc. v. Pentair Water Pool and Spa, Inc.*, Case IPR2013-00287, U.S. Pat. No. 7,704,051 (28 pages).
Petition for Inter Partes Review of U.S. Pat. No. 7,704,051, Before the Patent Trial and Appeal Board (77 pages).
Petitioner Reply to Patent Owner Response, *Hayward Industries, Inc. v. Pentair Water Pool and Spa, Inc.*, Case IPR2013-00287, U.S. Pat. No. 7,704,051 (28 pages).
Stephen Homsey, School of Science and Engineering, Teesside University, A Review of Relay Auto-tuning Methods for the Tuning of PID-type Controllers (Nov. 21, 2016 date from Internet Archive), available at <https://warwick.ac.uk/fac/cross_fac/iatl/reinvention/issues/volume5issue2/homsey/>.
Vance VanDoren, Ph.D., P.E., Relay Method Automates PID Loop Tuning, A traditional loop tuning technique has been modified to simplify its implementation (Sep. 1, 2009) (Dec. 7, 2016 date from

(56) References Cited

OTHER PUBLICATIONS

Internet Archive), available at <https://www.controleng.com/search/search-single-display/relay-method-automates-pid-loop-tuning/4a5774decc.html>.
Brett Beauregard, Arduino PID Autotune Library (Jan. 28, 2012) (Apr. 26, 2017 date from Internet Archive), available at <http://brettbeauregard.com/blog/2012/01/arduino-pid-autotune-library/>.

* cited by examiner $$K_p e(t) + K_i \int_0^t e(\tau) d\tau + K_d \frac{d}{dt} e(t)$$

AUTOMATIC POOL CLEANER TRACTION CORRECTION

BACKGROUND

Field

The present invention relates to a pool cleaner, and, more specifically to a pool cleaner with automatic cleaner traction correction to account for different swimming pool surfaces and conditions.

Related Art

Swimming pools commonly require cleaning. Beyond the treatments and filtration of pool water, the bottom wall and side walls of a pool are scrubbed regularly. Automated pool cleaning devices, e.g., swimming pool cleaners, have been developed to routinely navigate about the pool walls, cleaning as they go.

During cleaning, the pool cleaner will traverse the pool surfaces brushing or scrubbing the debris therefrom. The pool cleaner can be designed to operate at a certain speed while traversing certain walls or operating in certain modes. However, due to many different variables such as obstacles in the pool, changes in pressure, and different pool surfaces, the speeds and angular rates of the pool cleaner can change to an undesirable speed while cleaning the pool.

In order to overcome this problem, pool cleaners can be designed to have a setpoint, which is a desired target for a process variable. In the case of maintaining the angular rate of a pool cleaner, the process variable could be the angular rate of the pool cleaner. Accordingly, the pool cleaner can monitor the angular velocity of the cleaner and if there is an error, the pool cleaner can adjust the motors speed instruction in an effort to achieve the setpoint on the angular velocity of the cleaner.

A pool cleaner can adjust the motor speed instruction based on a "Proportional Integral Derivative" or "PID" control loop formula which takes into account the present error, historical error and future error in deviations from the desired set-point on the angular velocity (or other process variable). In other words, a PID control loop accounts for the input at the present moment, things learned from historical data, and the future projected data. Each one of the three parts to the PID control loop can have a constant factor or coefficient associated with it, also known respectively as "proportional gain," "integral gain," and "derivative gain." Each "gain" represents how much emphasis or weight to put on that part of the formula. In some situations, it could be desirable to focus only on present and historical errors, in which case the gain for the D component is zero, which would result in a "PI" control loop. Alternatively, it could be desirable to focus only on the present error, in which case the gain for the I and D components are zero, which results in a "P" control loop. As used herein, the term "PID" control module can be understood to include within its scope, a "PI" control module (in which the derivative gain is 0) and a "P" control module (in which the integral gain and the derivative gain is 0).

The process of pre-assigning gain values can be called "tuning." The issue with tuning pool cleaners is that some fixed set of gain values may perform well on some pool surfaces while not performing well on other surfaces because of the difference in traction on the wheels of the pool cleaner. Moreover, pool surfaces can vary greatly from one pool to another. The surfaces can range from concrete, vinyl, fiberglass, tile, and many variations in between. Accordingly, it is difficult to tune the gain values in advance because it cannot be known what pool surface the cleaner will clean.

Therefore, there exists a need for a pool cleaner designed with the ability to automatically account for the differences in traction on any pool surface it may encounter while cleaning.

SUMMARY

A pool cleaner is provided including a top housing, a chassis and a computing system. The computing system can include a PID control module, for example, for maintaining a process variable at a setpoint value. The PID control module can be operable to execute various instructions. First, the PID control module can receive the setpoint value for the process variable in memory. Second, the PID control module can monitor the process variable of the pool cleaner while it is cleaning a pool surface to obtain a present state of the process variable. Third, the PID control module can calculate the phase difference and ultimate gain between the setpoint value of the process variable and the present state of the process variable. Finally, the PID control module can automatically tune ("auto-tune") the PID control module to account for the pool surface the pool cleaner is cleaning by using the phase difference and ultimate gain previously calculated.

BRIEF DESCRIPTION OF THE DRAWINGS

The foregoing features and others will be apparent from the following Detailed Description, taken in connection with the accompanying drawings, in which.

DETAILED DESCRIPTION OF THE INVENTION

The present invention relates to a pool cleaner with automatic cleaner traction correction to account for different swimming pool surfaces, as discussed in detail below in connection with FIGS. 1-6. Any type of pool cleaner can be used, e.g., a positive pressure pool cleaner, a negative pressure (suction) pool cleaner, and/or a robotic (electric/robot) pool cleaner. However, given that the present disclosure operates with electricity, the present disclosure is preferably, but not necessarily, used with a pool cleaner whose primary power source is electricity (e.g., a robotic pool cleaner). However, the present disclosure could be provided in connection with a pool cleaner whose primary source of power is negative pressure (suction) and/or positive pressure, such as in connection with a battery provided for some functionality.

Examples of robotic (electrical) cleaners are disclosed in U.S. Pre-Grant Patent Application Publication No. 2016/0215516, published Jul. 28, 2016, entitled "Swimming Pool Cleaner With Hydrocyclonic Particle Separator And/Or Six-Roller Drive System" (Hayes/Teuscher/Marciano), U.S. Pre-Grant Patent Application Publication No. 2016/0244988, published Aug. 25, 2016, entitled "Pool Cleaner With Optical Out-Of-Water And Debris Detection" (Barcelos/Teuscher), and U.S. Pat. No. 8,869,337, issued Oct. 28, 2014, and entitled "Pool cleaning device with adjustable buoyant element" (Sumonthee), and the contents of each and all of the foregoing are hereby incorporated by reference.

Figure 1:
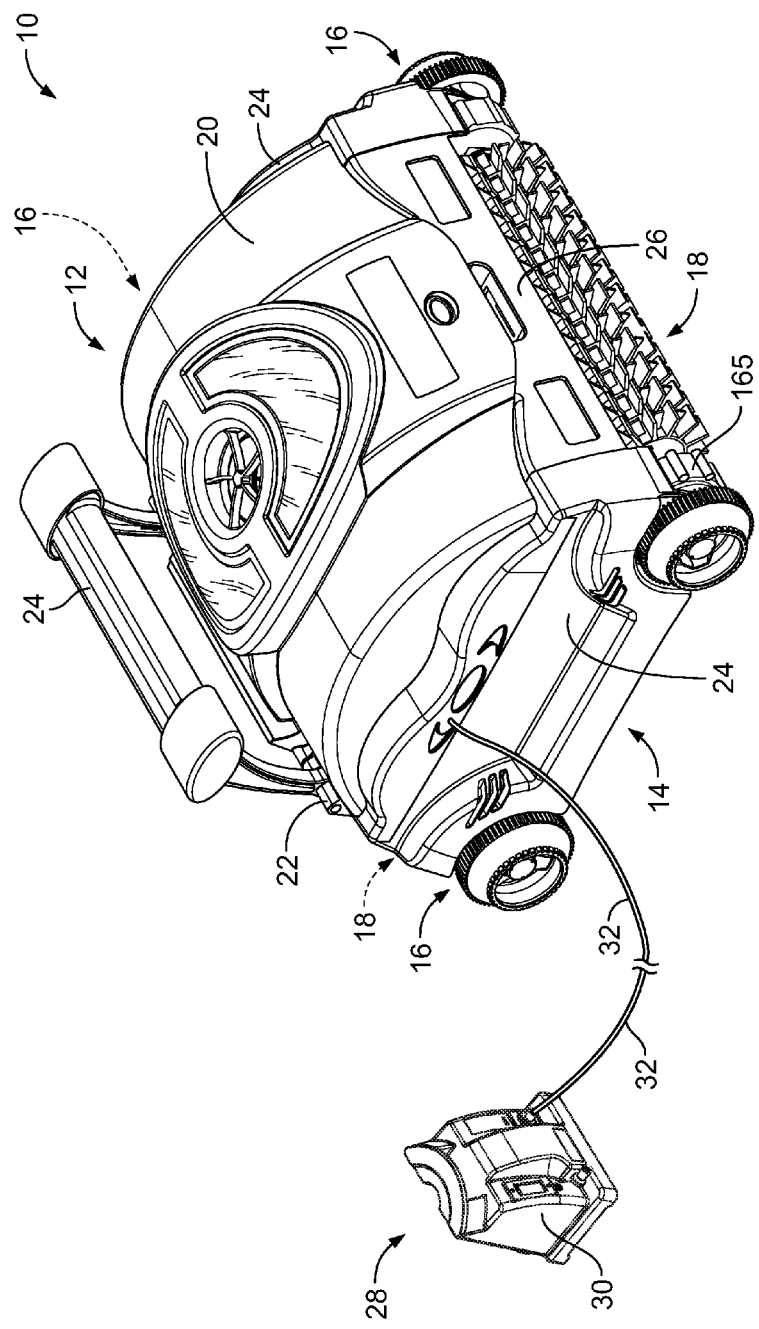
FIG. 1 is a perspective view of an embodiment of a pool cleaner of the present disclosure.

With reference to FIG. 1, a pool cleaner 10 is provided. The cleaner 10 includes a top housing 12, a bottom housing 14, a plurality of wheels 16, and a plurality of rollers 18. The top housing 12 includes a lid 20 which is pivotally associated with the bottom housing 14. For example, the bottom housing 14 and top housing 12 may include a hinge 22 for hingedly connecting the lid 20 relative to the bottom housing 14. The top housing can also include a handle 24 for facilitating extraction of the cleaner 10 from a pool.

The bottom housing 14 includes side panels 24 and front panel 26. Together, the top housing 12, the bottom housing 14, side panels 24, and front panel 26 form a cavity for housing various internal components within the cleaner 10. The bottom housing 14 allows the plurality of wheels 16 to be secured to the cleaner 10. The plurality of wheels 16 allow the cleaner 10 to traverse the swimming pool surfaces to clean debris. The plurality of wheels 16 is an example of a means for traversing a pool surface to be cleaned. The means for traversing a pool surface can include, but is not limited to, tank treads, rollers and similar means. The plurality of rollers 18 facilitate the collection of debris and particles into the cleaner 10.

The cleaner 10 is connected to an external power supply 28. The power supply 28 generally includes a transformer/control box 30 and a power cable 32 in communication with the transformer/control box 30 and the cleaner 10. In an exemplary embodiment, the pool cleaner 10 is an electrical pool cleaner.

Figure 2:
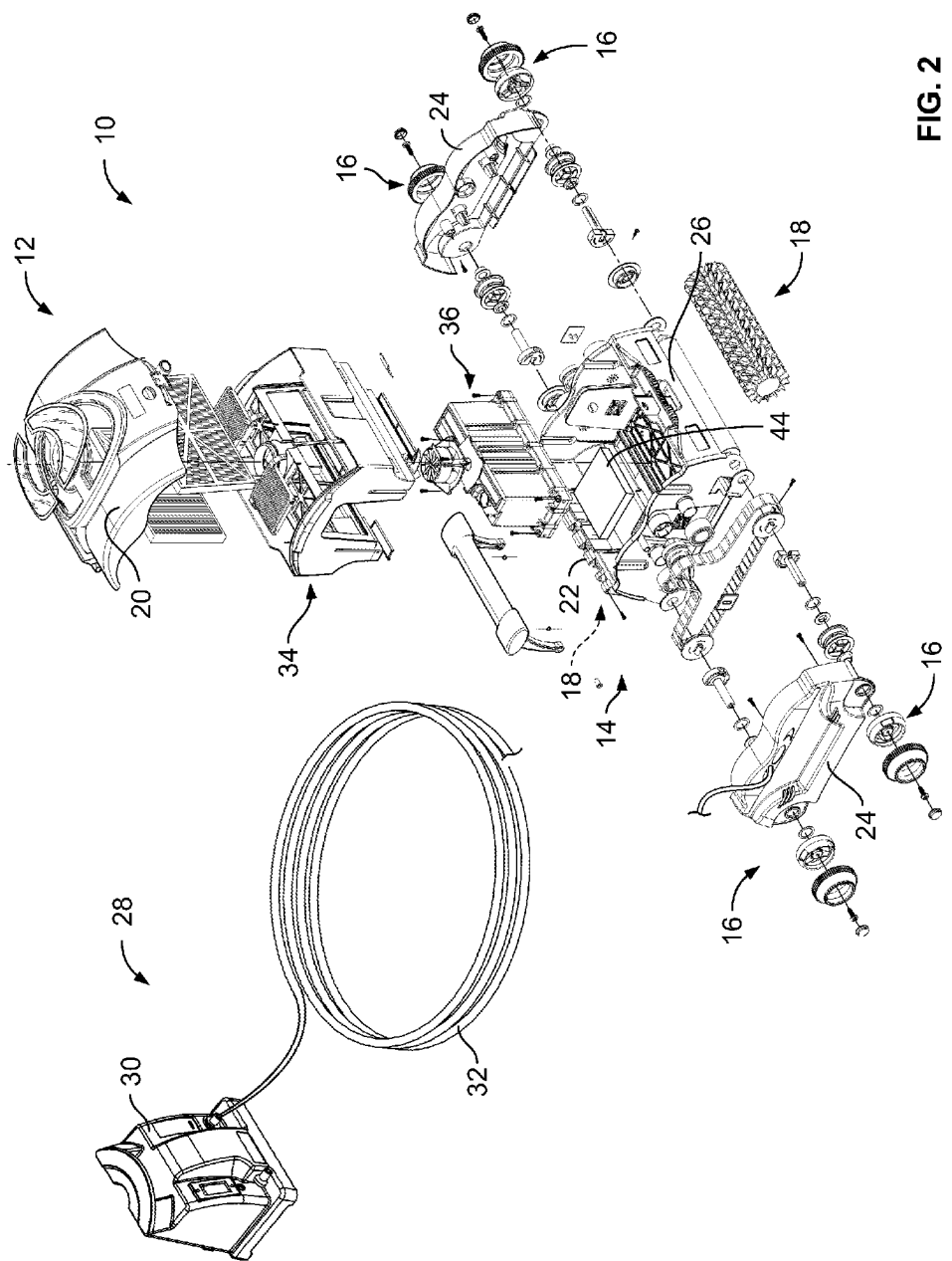
FIG. 2 is an exploded view of an embodiment of the pool cleaner of the present disclosure.

Reference will now be made to FIG. 2 showing an exploded view of the pool cleaner 10. The pool cleaner 10 houses a filter 34 for collecting debris from the swimming pool. The pool cleaner 10 also houses a motor drive 36 for driving the plurality of wheels 16. A float can be used to turn the cleaner 10. Alternatively, two motors can be used for a differential drive. The motor drive 36 can receive electrical control signals from a computing system 44, also housed within the pool cleaner 10. A person of ordinary skill in the art can appreciate that there are many suitable ways to house the computing system 44 so that it can monitor and send signals to the plurality of wheels 16 to achieve the purpose of the present disclosure. Furthermore, a person of ordinary skill in the art would appreciate that the computing system 44 can be potted with a compound or otherwise sealed to prevent water damage when the cleaner is submerged and cleaning a swimming pool. The computing system 44 contains the functionality to control the plurality wheels 16 to implement automatic traction control and account for varying pool surfaces to maintain a setpoint speed of the pool cleaner as will be discussed in greater detail below.

Figures 3, 4:
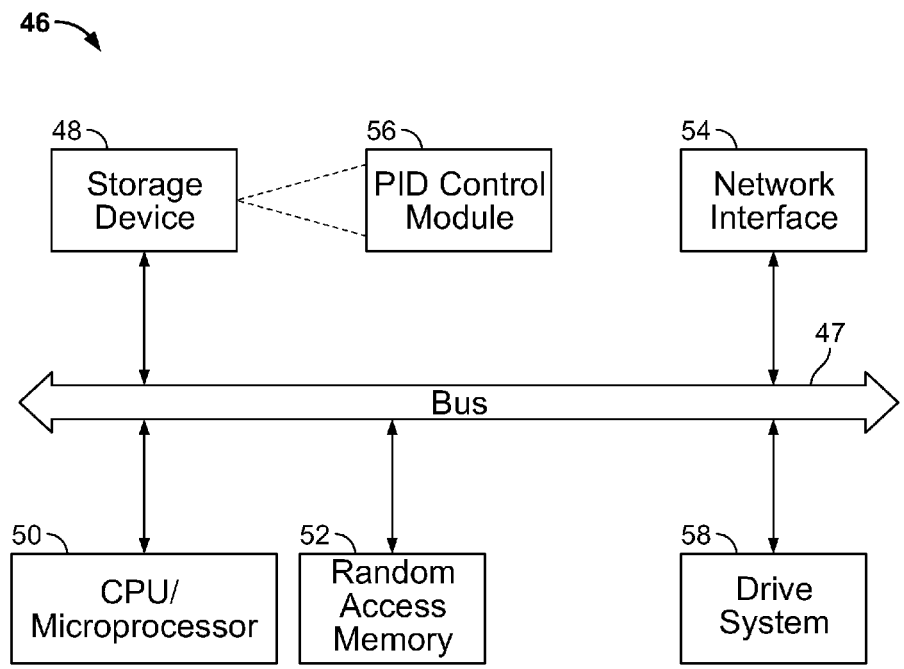
FIG. 3 is a block diagram of an embodiment of the pool cleaner control system using the PID control loop system.
FIG. 4 is a drawing showing the PID control loop formula.

Reference will now be made to FIG. 3 showing a block diagram of a cleaner control system using a PID control loop system 46. The PID control loop system 46 includes, for example, a bus 47, a storage device 48, central processing unit or microprocessor 50, a random access memory 52, and a network interface 54. The bus 47 allows data to be transferred from the various components in the system 46. The storage device 48 includes a PID control module 56 for generating the proper instructions for a drive system 58 which controls the plurality of wheels 16 to provide automatic traction control. The network interface 54 allows the system 46 to be updated via wireless or Ethernet connection. In particular, the network interface 54 allows the system 46 to have updated historical data, as will be explained in greater detail below.

Reference will now be made to FIG. 4 which shows a PID control loop equation 60 of the PID control functionality for the pool cleaner 10. The PID control module 56 can have a setpoint angular velocity for the cleaner induced by the motor driving the plurality of wheels 16. Setpoint angular velocity is used in the present application as only an example, and the present disclosure can be applied to monitoring any process variable. While the pool cleaner 10 is operating, the PID control module 56 can receive information regarding the body angular velocity by using a gyroscope sensor, optical flow or similar means known to those of ordinary skill in the art. If the body angular velocity is outside a setpoint range, the PID control module 56 will use the equation 60 to determine the bias to the motor speed instruction in an effort to course-correct the pool cleaner 10 to achieve the desired setpoint range. It should be noted that the setpoint range can be any setpoint range suitable to those of ordinary skill in the art. The present disclosure is not limited by a certain setpoint range. The equation 60 includes three primary parts in determining the amount of bias to apply to the motor speed instruction. First, the proportional component 62 constitutes the present error. Second, integral component 64 constitutes the historical error. Third, the derivative component 66 constitutes the future error. Each of these three primary parts of equation 60 has two subparts. The proportional component 62 has a proportional gain 68 and the calculation for the magnitude of error 70. The integral component 64 has an integral gain 72 and a calculation for the integral of error 74 for determining the historical error. The derivative component 66 has a derivative gain 76 and a derivative calculation for the future error 78 for determining the projected future error. The three gain values are constants which can apply a "weight" to each respective part of the equation 60. For example, a gain of 0 for the derivative gain 76 means the equation 60 and the control functionality does not take future error 66 into account and therefore the control functionality is reduced to PI control.

Figure 5:
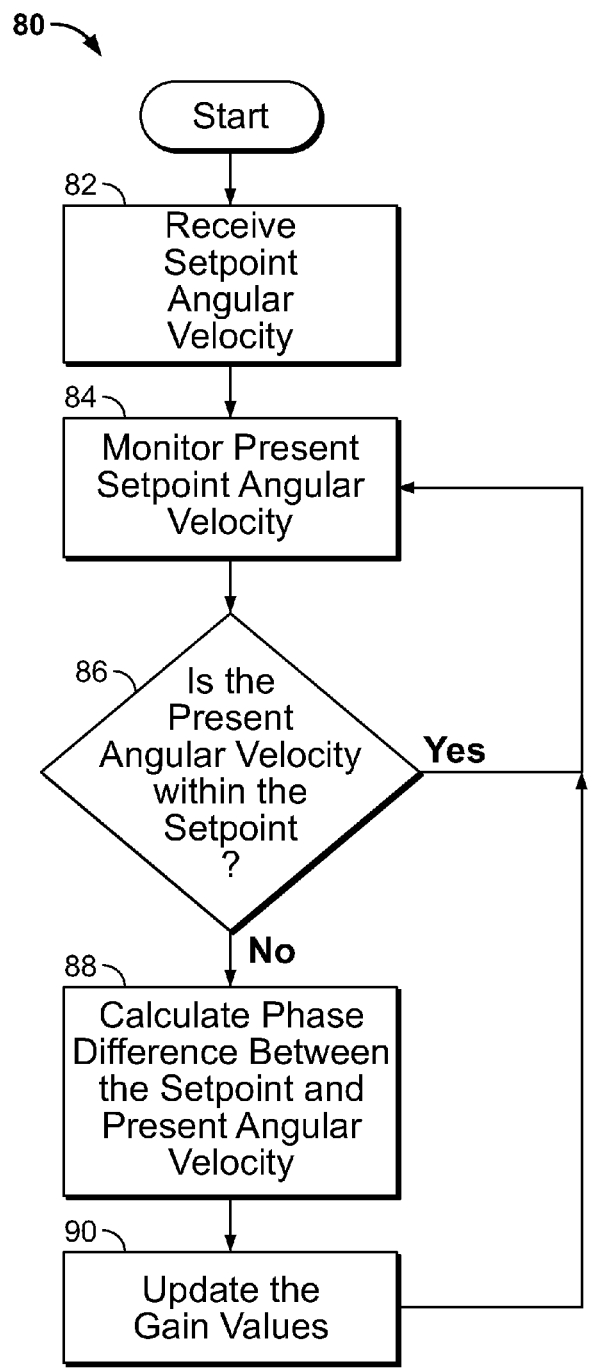
FIG. 5 is a flowchart of the auto-tuning process of the PID control loop system.

FIG. 5 is a flowchart of the auto-tuning process 80 shown in greater detail. The auto-tuning process automatically sets the proportional gain 68, integral gain 72, and derivative gain 76 of equation 60. Automatically setting these gain values is advantageous because a constant preset gain value could allow the PID control functionality to perform well on one pool surface while not allowing proper performance on different pool surface. The number of pool surfaces may vary significantly, so the automatic tuning process 80 can account for any pool surface the cleaner 10 may encounter. The automatic tuning process 80 starts with step 82 where the process 80 receives a setpoint body angular velocity. The setpoint body angular velocity can be called the commanded value of the angular velocity. The setpoint body angular velocity can be any desirable velocity known to those of ordinary skill in the art. The setpoint body angular velocity can be set upon manufacture of the pool cleaner 10 or it can be updated remotely through the network interface 54.

Figure 6:
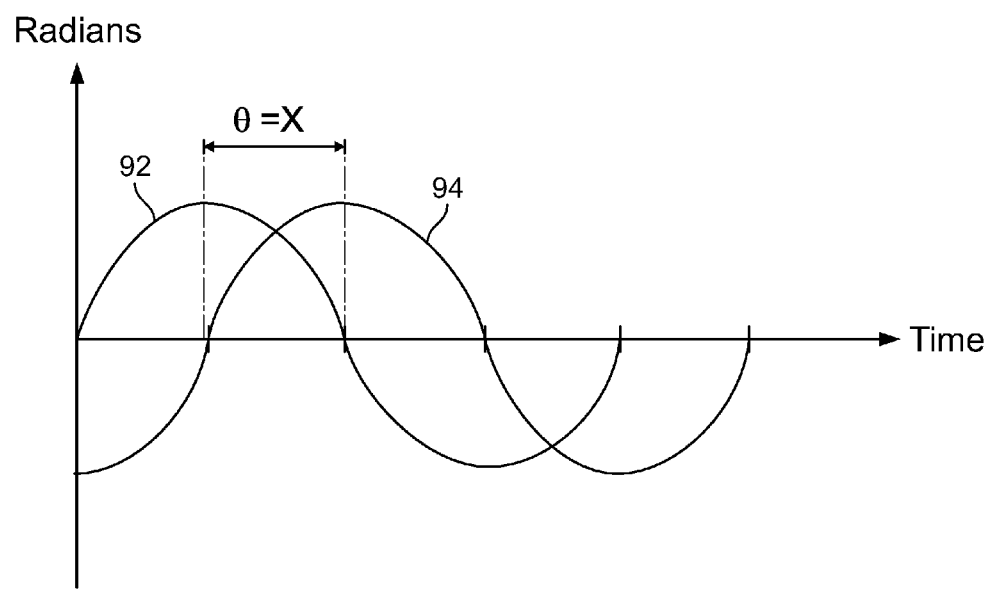
FIG. 6 is drawing showing the phase difference between two waveforms.

As shown in FIG. 6, the setpoint angular velocity can be represented as a wave 92 on an oscilloscope. In step 84, the automatic tuning process 80 monitors the present setpoint angular velocity (e.g., by measurement with a sensor). A person of ordinary skill in the art can use any known sensor in the art to obtain the angular velocity. The measured angular velocity can be represented as a second wave 94 on an oscilloscope. In step 86, the automatic tuning process 80 makes a determination as to whether the present angular velocity is within the setpoint. If a positive determination is made, the process 80 proceeds to step 84. If a negative determination is made, the process 80 will proceed to step 88 where it will calculate the phase difference between the setpoint body angular velocity and the measured body angular velocity, and the ultimate gain from the peaks of the measured body angular velocity. As shown in FIG. 6, the phase difference is shown as the difference between waves 92 and 94, represented as theta(θ). The PID control module 56 can also send a signal to the motor drive 36 in order to bias the motor drive in an effort to course correct the pool cleaner 10 to maintain the cleaner 10 at the setpoint process variable.

In step 90, the automatic tuning process 80 updates the proportional gain 68, integral gain 72, and derivative gain 76 in equation 60. The automatic tuning process 80 uses the phase difference calculated in step 88 when updating the proportional gain 68, integral gain 72, and derivative gain 76. There is a mathematical relationship between the phase difference and how much traction the plurality of wheels 16 have on the pool surface. There is also a relationship between how much traction the plurality of wheels 16 have and the material the pool surface is made of. From most traction to least traction, the following is an example of the relative traction on pool surfaces: concrete→vinyl→fiberglass→tile. Therefore, the PID control module 56 automatically tunes the pool cleaner 10 based on the traction and pool surface. The automatic tuning process 80 derives the proportional gain 68, integral gain 72, and derivative gain 76 by using the following function:

$$Phi = 180 - theta$$

$$Kp = Ku*\cos(phi)$$

$$Kd = 0.25*Ki$$

$$Ki = (\tan(phi) + (\tan(phi)^2 + 16)^{(1/2)})/(2*Wu)$$

The proportional gain 68, integral gain 72, and derivative gain 76 can be tuned based on surface the pool cleaner 10 is currently cleaning. For a concrete pool surface, the proportional gain 68 could be 5, the integral gain 72 could be 1, and the derivative gain 76 could be 0.25. For a vinyl pool surface, the proportional gain 68 could be 5, the integral gain 72 could be 1, and the derivative gain 76 could be 0.25. For a fiberglass pool surface, the proportional gain 68 could be 5, the integral gain 72 could be 1, and the derivative gain 76 could be 0.25. For a tile pool surface, the proportional gain 68 could be 5, the integral gain 72 could be 1, and the derivative gain 76 could be 0.25. There can be gain scheduling, e.g., where these gain values can be located in a look-up table stored in memory in the storage device 48 and retrieved based on the phase difference, e.g., based on the theta value. The PID control module 56 can receive an input from the user indicating which pool surface the cleaner 10 will clean. The PID control module 56 can receive this input via the network interface 54 or by a push button located on the cleaner 10 or on a central controller. A user can send the input from a smartphone, PDA, tablet or a similar device which can be received by the cleaner 10 via the network interface 54. Upon receiving this input, the PID control module 56 can use the look-up table and input the proper gain values in the equation 60. For example, a user interface could include buttons or a touchscreens that allow a user to input a choice/selection between a pool wall formed of concrete, vinyl, fiberglass, or tile, and then retrieve, calculate, and/or adjust the gain values accordingly. The system of the present application can tune one gain value, two gain values, or three gain values.

Additionally and/or alternatively, the PID control module 56 can auto-tune the gain values (e.g., calculate the gain values in real-time) where it automatically determines the correct gain values to input into the equation 60 by relying on the phase difference in theta calculated in step 88. Depending on the phase difference, the PID control module 56 can automatically determine the correct pool surface and the many variations thereof. A look-up table is not required. Instead, the proportional gain 68, integral gain 72, and derivative gain 76 could be formulas themselves which are constantly updating. The formula for the gain values can be based on the theta value calculated in step 88.

Figure 7:
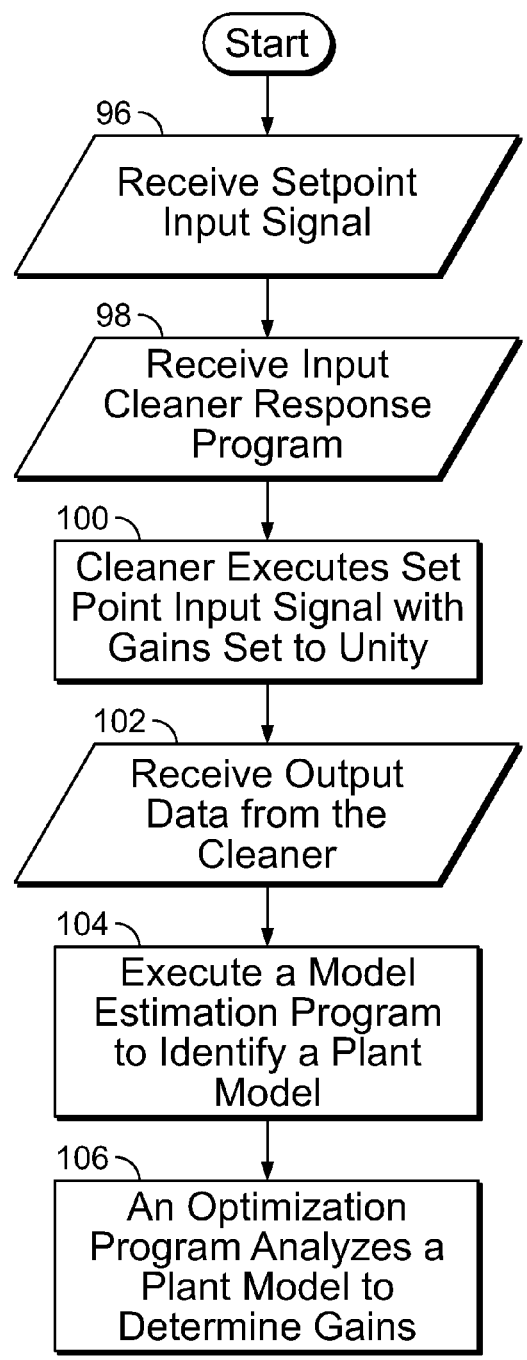
FIG. 7 is a flowchart illustrating the processing steps for an embodiment for implementing automatic tuning of gain values.

Reference will now be made to FIG. 7 which is a flowchart illustrating processing steps 96-106 for an alternative embodiment for implementing automatic tuning of gain values. In step 96, the pool cleaner 10 can receive a setpoint input signal. The setpoint input signal is not limited to angular velocity and can include other control parameters for the pool cleaner 10. Further, the setpoint input signal is not limited to a signal in the frequency domain, but can include signals in the time domain. Examples of the setpoint input can include, but is not limited to, a swept sine wave, a square wave, or a step function. In step 98, the pool cleaner 10 receives a response program for operating the pool cleaner. The response program can include, but is not limited to, minimum time for cleaning the pool, minimum energy used by the pool cleaner 10, or minimum wear on the pool cleaner 10. In step 100, the cleaner executes the setpoint input signal with all gains set to unity. In step 102, the pool cleaner 10 receives output data from the pool cleaner 10.

In step 104, the pool cleaner 10 executes a model estimation program which uses the data received from the pool cleaner 10 in step 102 to identify a plant model. The model estimation program can utilize a parametric approach for minimizing value functions or metrics. Minimizing functions can include methods of batch gradient descent where the function is quadratic or has a global minimum. Stochastic gradient descent can be used with multiple state methods to avoid local minima. Using a single metric, (L1, L2 norm, mean error), the pool cleaner 10 can implement a "leave-one-out" strategy for a linear model. A buffer can be used to contain the mean error, and the plant model representing the smallest mean error can be selected. In step 106, an optimization program analyzes a plant model to determine the appropriate gain values. The present disclosure is not limited by any type of plant model, and the specific plant models discussed are for explanatory purposes only. One example of a plant model could be a linear dynamic model where traction is estimate as torque is applies to the right and left wheels of the pool cleaner 10 via tractive effort. The following is a representation of this model:

$$M\ddot{q} = B\tau - C\lambda$$

where $$M = \begin{bmatrix} m_t & 0 & dm_t\sin\phi & 0 & 0 \\ 0 & m_t & -dm_t\cos\phi & 0 & 0 \\ dm_t\sin\phi & -dm_t\sin\phi & I_t & 0 & 0 \\ 0 & 0 & 0 & I_{wy} & 0 \\ 0 & 0 & 0 & 0 & I_{wy} \end{bmatrix}$$

$$q = \begin{bmatrix} x_c \\ y_c \\ \phi \\ \theta_r \\ \theta_l \end{bmatrix} \quad B = \begin{bmatrix} \cos\phi/r & \cos\phi/r \\ \sin\phi/r & \sin\phi/r \\ b/r & -b/r \\ 1 & 0 \\ 0 & 1 \end{bmatrix} \quad C = \begin{bmatrix} dm_t\dot{\phi}^2\cos\phi \\ dm_t\dot{\phi}^2\sin\phi \\ 0 \\ 0 \\ 0 \end{bmatrix}$$

and $\tau = [\tau_l, \tau_r]^T$.

Another plant model could use a plucker transformation into body coordinated as shown below:

$$\vec{v}_{cg\_slip} = \left(p_1 \frac{f_{lon}}{f_z} V_{lon} + p_2 V_{lon}\right) \hat{lon} + \left(p_3 \frac{f_{lat}}{f_z} V_{lon}\right) \hat{lat}$$

$$\vec{\omega}_{cg\_slip} = \left(p_4 \frac{f_{lat}}{f_z} V_{lon} + p_5 V_{lon} + p_6 V_{ang}\right) \hat{ang}$$

$$\vec{v}_{cg} = \begin{bmatrix} \vec{\omega}_{cg} \\ \vec{v}_{cg} \end{bmatrix}, \vec{f}_{cg} = \begin{bmatrix} \vec{\tau}_{cg} = 0 \\ \vec{f}_{cg} \end{bmatrix}$$

$$\vec{v}_{cg} = (X_b^{cg})\vec{v}_b$$

$$\vec{f}_{cg} = (X_b^{cg}) - T_{\vec{f}_b}$$

Still further, another plant model could modeled as a second order system in the laplace domain as show in the equation below:

$$P(s) = \frac{As + B}{Cs^2 + Ds + E}$$

The optimization program can take rely on the fact that a plant model can have an inherent stability criteria based on the physics of the plant model. The optimization program can analyze the plant model and determine the gain values by taking the laplace transform of the plant mathematical model, and factoring the transfer function into poles and zeros as shown in the following equation:

$$G(s) = k \frac{(s - z_1)(s - z_2) \ldots (s - z_m)}{(s - p_1)(s - p_2) \ldots (s - p_n)}$$

The location of the poles are where the transfer function does undefined. A PID controller could have a transfer function in the following form:

$$K_p + \frac{K_i}{s} + K_d s = \frac{k_d s^2 + k_p s + K_i}{s}$$

Figure 8:
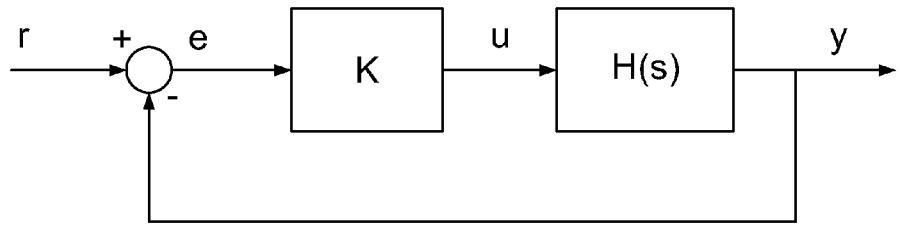
FIG. 8 is a drawing showing the root locus in the s plane of an (open-loop) transfer function.

A closed loop transfer can be the product of the plant transfer function and the PID transfer function. As shown in FIG. 8, the root locus in the s plane of an (open-loop) transfer function H(s) is a plot of the locations (locus) of all possible closed-loop poles with proportional gain K and unity feedback.

The closed loop transfer function is:

$$\frac{Y(s)}{R(s)} = \frac{KH(s)}{1 + KH(s)}$$

Where G(s)=H(s), the pool cleaner 10 can determine when a certain gain value will make the plant model and system response parameters go unstable as based on the location of the zeros and the poles.

In one embodiment, traction estimation of a pool cleaner 10 can implement a square wave input for the target (desired) angular rate. The angular rate can then be demuxed into motor speeds for both the left and right driver to provide rotation motion for the wheels of the pool cleaner 10. The actual angular rate is recorded and a peak detection algorithm can be used to determine the ultimate gain and the period for the closed loop plant model. A peak detection algorithm can work by using a first in first out ("FIFO") buffer which only adds values to the values which are greater or less than the last value. The peak estimation algorithm determines the open loop system response. The gain values modify the transfer function of the plant model from an open loop transfer function to a closed loop transfer function. The gain values become incorporated in the pool cleaner 10 dynamics. The plant model is a representation of the physics in the traction estimation algorithm for determining gain values. Modeling in the time domain can be used based on Ziger Nichols tunings. Varying levels of traction can act as a low pass filter to the system response of the cleaner 10.

Figure 9:
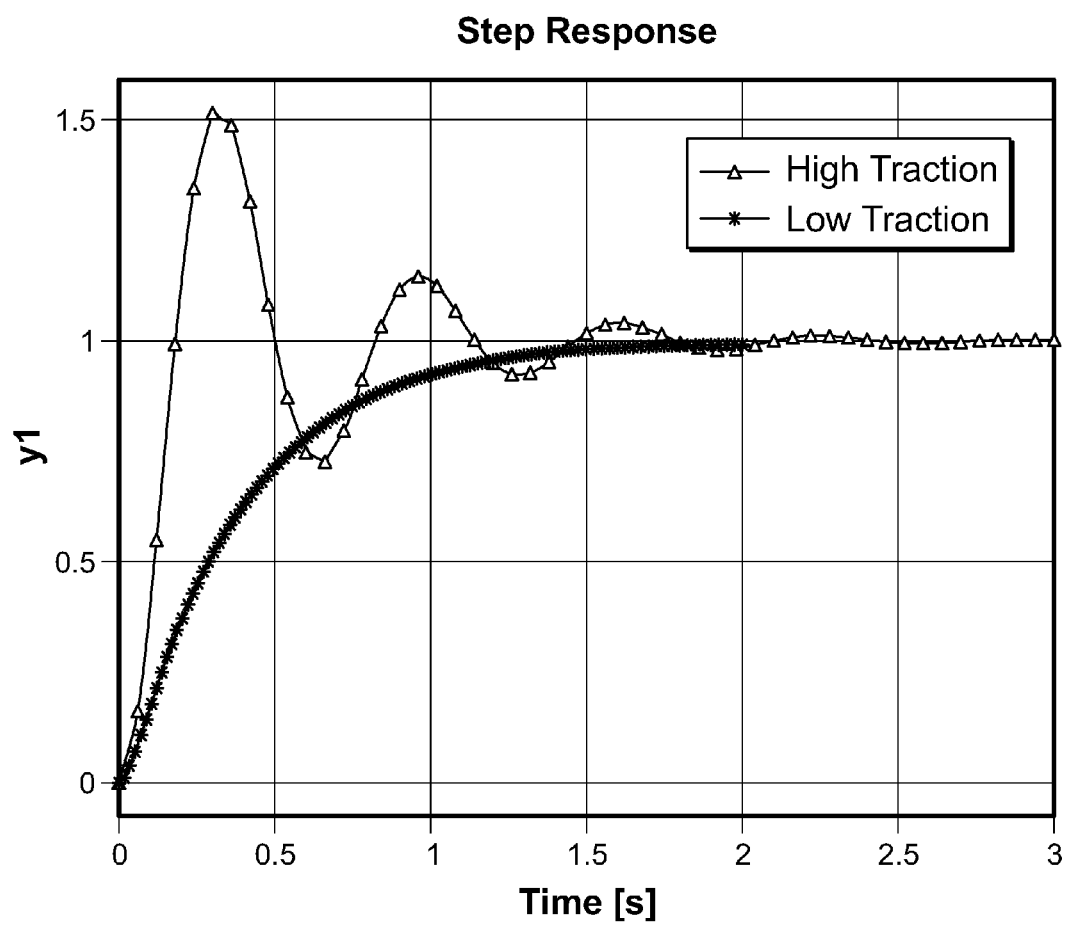
FIG. 9 is a graph showing the step response over time of an implementation of an embodiment of the pool cleaner on a high and low traction surface.
Figure 10:
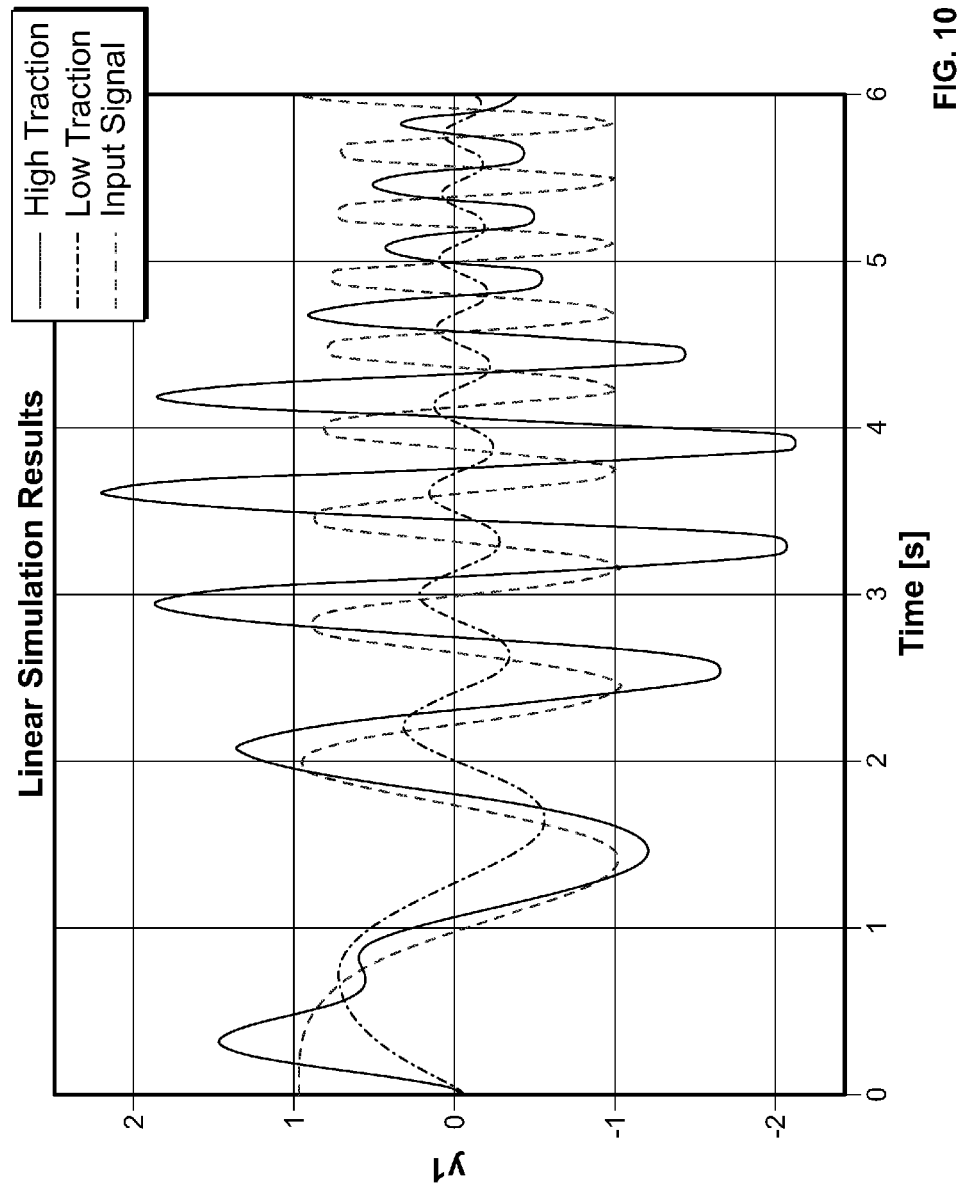
FIG. 10 is a graph showing the phase difference between the pool cleaner on a high traction and low traction surface.
Figure 11:
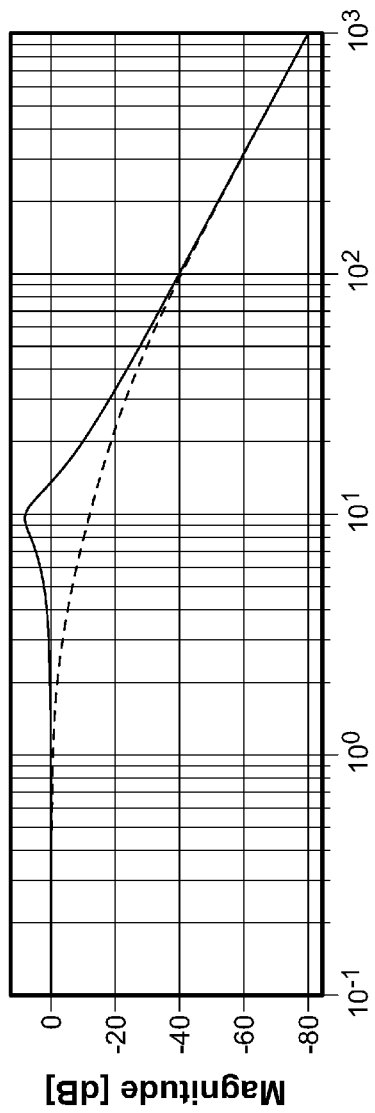
FIG. 11 is a graph showing the frequency response of the pool cleaner on a low and high traction surface with respect to the magnitude.
Figure 12:
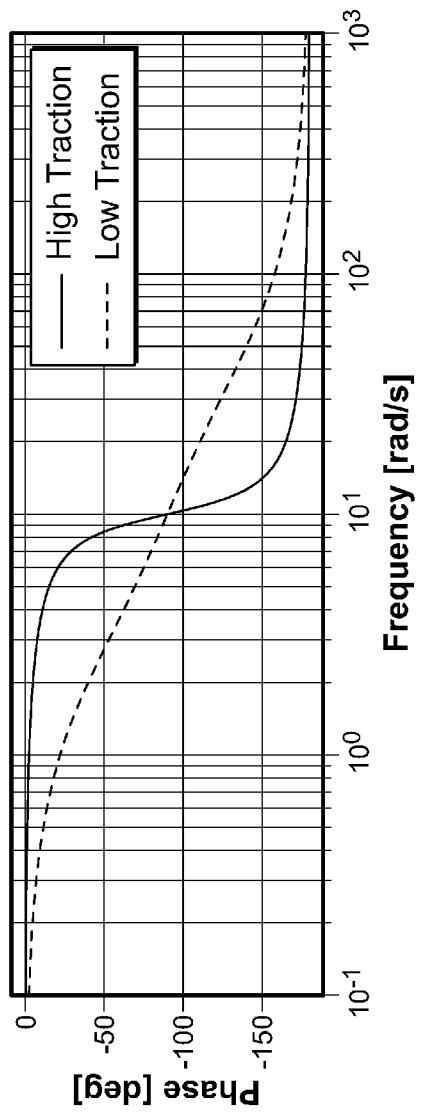
FIG. 12 is a graph showing the frequency response of the pool cleaner on a low and high traction surface with respect to the phase.

FIG. 9 is a graph showing the step response over time of an implementation of an embodiment of the present disclosure. FIG. 9 shows the step response of the pool cleaner 10 on a high and low traction surface. FIG. 10 is a graph showing the phase difference between the pool cleaner 10 on a high traction and low traction surface. FIGS. 11 and 12 describe the frequency response of the pool cleaner 10 on a low and high traction surface. FIG. 11 in particular is a graph showing the frequency with respect to the magnitude and FIG. 12 shows the frequency with respect to the phase.

Having thus described the invention in detail, it is to be understood that the foregoing description is not intended to limit the spirit or scope thereof. It will be understood that the embodiments of the present invention described herein are merely exemplary and that a person skilled in the art may make any variations and modification without departing from the spirit and scope of the invention. All such variations and modifications, including those discussed above, are intended to be included within the scope of the invention.

What is claimed is:
1. A pool cleaner comprising:
    a housing;
    a means for traversing a pool surface to be cleaned; and a computing system having a PID control module stored thereon for maintaining a process variable at a setpoint value, the computing system configured to execute the following instructions:
receive the setpoint value for the process variable;
monitor the process variable of the pool cleaner while it is cleaning a pool surface to obtain a present state of the process variable;
calculate the phase difference between the setpoint value of the process variable and the present state of the process variable; and
tune a gain value of the PID control module to account for the pool surface the pool cleaner is cleaning.

2. The pool cleaner of claim 1, wherein the process variable is angular velocity.

3. The pool cleaner of claim 1, wherein the computing system is housed within the pool cleaner.

4. The pool cleaner of claim 1, wherein the computing system includes a network interface for receiving historical error data and new setpoint values of the process variable.

5. The pool cleaner of claim 1, wherein the user provides input to the computing system as to what surface the pool cleaner will clean.

6. The pool cleaner of claim 5, wherein the input comes from a button.

7. The pool cleaner of claim 6, wherein the input is received from a network interface in the computing system.

8. The pool cleaner of claim 7, wherein the gain value is a formula that are based on the phase difference.

9. The pool cleaner of claim 8, wherein the PID control module sends a signal to a motor of the pool cleaner based on the measured process variable.

10. The pool cleaner of claim 9, wherein the PID control module uses a look-up table to automatically tune the gain value based on the user input of the pool surface.

11. The pool cleaner of claim 1, wherein the PID control module is a PI control module in which a derivative value is zero.

12. The pool cleaner of claim 1 wherein the means for traversing comprises a plurality of wheels.

13. A pool cleaner comprising:
a housing;
a means for traversing a pool surface to be cleaned; and
a computing system having a PID control module stored thereon for maintaining a process variable at a setpoint value, the computing system configured to execute the following instructions:
receive the setpoint value for the process variable;
monitor the process variable of the pool cleaner while it is cleaning a pool surface to obtain a present state of the process variable;
execute a model estimation program to identify a plant model; and
analyze the plant model to determine gain values of the PID control module.

14. The pool cleaner of claim 13, comprising a response program for maintaining the process variable at the setpoint value, the response program including at least one of (i) a minimum time for cleaning the pool, (ii) minimum energy used by the pool cleaner, and (iii) minimum wear on the pool cleaner.

15. The pool cleaner of claim 13, wherein the model estimation program can utilize a parametric approach for minimizing at least one of (i) value functions and (ii) metrics.

16. The pool cleaner of claim 13, wherein the plant model is at least one of (i) a linear dynamic model, (ii) a plucker transformation into body, and (iii) a second order system in the laplace domain.

17. A pool cleaner comprising:
a housing;
a means for traversing a pool surface to be cleaned; and
a computing system having a PID control module stored thereon for maintaining a process variable at a setpoint value, the computing system configured to execute the following instructions:
implement a square wave input for a target angular rate;
demux the target angular rate into motor speeds for left and right drivers to provide rotational motion for said means for traversing the pool surface;
record an actual angular rate;
determine a gain value and a period for a closed loop plant model using a peak detection algorithm;
modify a transfer function of the closed loop plant model using the gain value; and
using the gain value to tune the PID control module.

18. The pool cleaning of claim 17, wherein the peak detection algorithm uses a first in first out ("FIFO") buffer.

19. The pool cleaner of claim 17, wherein the peak detection algorithm determines an open loop system response.

20. The pool cleaner of claim 17 wherein the means for traversing comprises a plurality of wheels.

* * * * *